United States Patent
Qian et al.

(10) Patent No.: US 12,413,852 B2
(45) Date of Patent: Sep. 9, 2025

(54) METHOD OF RESYNCING A CONSERVING BATTERY-POWERED ELECTRONIC DEVICE WITH AN ACCESS POINT, AND ELECTRONIC DEVICE AND SYSTEM FOR PERFORMING THE METHOD

(71) Applicant: Arlo Technologies, Inc., Carlsbad, CA (US)

(72) Inventors: Nanjian Qian, San Diego, CA (US); Chris McGill, San Diego, CA (US); Mark Van Hoorebeke, Carlsbad, CA (US); Todd Van Cleave, San Marcos, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 138 days.

(21) Appl. No.: 18/496,354

(22) Filed: Oct. 27, 2023

(65) Prior Publication Data

US 2024/0147057 A1   May 2, 2024

Related U.S. Application Data

(60) Provisional application No. 63/420,947, filed on Oct. 31, 2022.

(51) Int. Cl.
*H04N 23/65* (2023.01)
*H04N 23/661* (2023.01)
(Continued)

(52) U.S. Cl.
CPC ........... *H04N 23/65* (2023.01); *H04N 23/661* (2023.01); *H04W 52/0241* (2013.01); *H04W 84/12* (2013.01)

(58) Field of Classification Search
CPC . H04N 23/65; H04N 23/661; H04W 52/0241; H04W 84/12; H04W 52/0235; H04W 52/028; H04W 52/0229
See application file for complete search history.

(56) References Cited

U.S. PATENT DOCUMENTS 8,880,104 B2    11/2014   Meylan et al.
9,125,152 B2    9/2015    Zhu et al.
(Continued)

FOREIGN PATENT DOCUMENTS

EP    2 114 103 A2    11/2009

OTHER PUBLICATIONS

Oddy, Keith, "https://www.ispreview.co.uk/index.php/2015/04/10-top-tips-boosting-home-wi-fi-wireless-network-speeds.html" Apr. 7, 2015.

(Continued)

*Primary Examiner* — Mekonnen D Dagnew
(74) *Attorney, Agent, or Firm* — Boyle Fredrickson, S.C.

(57) ABSTRACT

A method of conserving a battery-powered electronic device is disclosed. The electronic device is wirelessly communicable with an access point over a wireless local area network. Also disclosed are an electronic device and a system for performing the method. The method includes causing a first control architecture to be in an idle state; while the first control architecture is in an idle state and with a second control architecture, receiving a beacon frame from the access point, the beacon frame including electronic device association information, checking the beacon frame if the electronic device is associated with the access point, and providing a wakeup signal to the first control architecture when the electronic device is dissociated. The method further includes communicating from the second control (Continued)

architecture to the first control architecture that the electronic device was dissociated from the access point.

15 Claims, 6 Drawing Sheets

(51) Int. Cl.
  *H04W 52/02* (2009.01)
  *H04W 84/12* (2009.01)

(56) References Cited

U.S. PATENT DOCUMENTS

| | | | |
|---|---|---|---|
| 2010/0112950 A1* | 5/2010 | Haartsen | H04B 5/00 |
| | | | 455/41.3 |
| 2013/0176925 A1* | 7/2013 | Sampath | H04L 25/0204 |
| | | | 370/329 |
| 2013/0223308 A1 | 8/2013 | Chandra et al. | |
| 2017/0127349 A1 | 5/2017 | Skeoch et al. | |
| 2020/0145923 A1* | 5/2020 | Park | H04W 40/244 |
| 2023/0388926 A1* | 11/2023 | Kishore | H04W 28/0278 |

OTHER PUBLICATIONS

Riihikallio, Petri, "https://metis.fi/en/2018/05/dtim-en/#:~:text=To%20extend%20the%20battery%20life, Fi%20radio%20may%20be%20off", May 13, 2018.

* cited by examiner

```
20 23:36:53.202036  0.047664                    Vendor_09:da:aa (7_ Clear-to-send, Flags=..C
21 23:36:53.208957  0.054585  AP_44:97:56  Broadcast  Beacon frame, SN=1873, FN=0, Flags=......C,BI=31,SSID=AP_VMB_1549915952
22 23:36:53.214907  0.060535  AP_56:46:b4  Broadcast  Beacon frame, SN=1613, FN=0, Flags=......C,BI=31,SSID=AP_VMB_1552681802
23 23:36:53.216039  0.061667  AP_18:46:5a  Broadcast  Beacon frame, SN=232, FN=0, Flags=......C,BI=31,SSID=AP
```

> Frame 22: 280 bytes on wire (2240 bits), 280 bytes captured (2240 bits) on interface 0
> Radiotap Header v0, Length 25
> 802.11 radio information
> IEEE 802.11 Beacon Frame, flags: ......c
∨ IEEE 802.11 wireless LAN
  > Fixed parameters (12 bytes)
  ∨ Tagged parameters (215 bytes)
    > Tag: SSID parameter set: AP_VMB_1552681802  ← Displaying the contents of this beacon frame
    > Tag: Supported Rates 1(B), 2(B), 5.5(B), 11(B), 6, 9, 12, 18, [Mbits/sec]
    > Tag: DS Parameter set: Current Channel: 9        ← This is one information Element in the beacon.
    > Tag: Traffic Indication Map (TIM): DTIM 18 of 0 bitmap    It contains the SSID of this Base Station
    > Tag: Country Information: Country Code CA, Environment Any
    > Tag: ERP Information
    > Tag: Extended Supported Rates 24, 36, 48, 54, [Mbit/sec]
    > Tag: RSN Information
    > Tag: HT Capabilities (802.11n D1.10)
    > Tag: HT Information (802.11n 01.10)
    > Tag: Extended Capabilities (8 octets)
    > Tag: Vendor Specific: Microsoft Corp.: WHM/WME: Parameter Element
    > Tag: Vendor Specific: Microsoft Corp.: WPS
    Tap: Vender Specific: AP: Assoc bitmap ← AP specific IE to the beacon payload. Contains a bitmask for all
                                              the nodes that have joined this system

FIG. 6

METHOD OF RESYNCING A CONSERVING BATTERY-POWERED ELECTRONIC DEVICE WITH AN ACCESS POINT, AND ELECTRONIC DEVICE AND SYSTEM FOR PERFORMING THE METHOD

CROSS-REFERENCE TO RELATED APPLICATIONS

This application claims priority to U.S. Provisional Application Ser. No. 63/420,947, filed Oct. 31, 2022, the entire contents of which is incorporated herein by reference.

BACKGROUND OF THE INVENTION

1. Field of the Invention

The present invention relates to a system and method of conserving battery power in an electronic device wirelessly communicating over a network with an access point. The present invention more particularly relates to a system and method of identifying a non-synced electronic device with an access point and rectifying the same.

2. Discussion of the Related Art

Wi-Fi™ enabled video cameras are in wide use and are often used for monitoring and security purposes. Content captured by wireless enabled cameras can be communicated over the Internet. The content can be viewed in substantially real time and/or recorded for later viewing.

Some video cameras are Wi-Fi™ enabled and battery powered. An example of such a camera is disclosed in U.S. Pat. No. 9,713,084, assigned to Netgear, Inc., the content of which is incorporated herein by reference. A wireless enabled, battery powered camera may have a divided control architecture to help conserve battery life. A first control architecture may have a first functionality that consumes more power and a second control architecture may have a second functionality that consumes less power. Further, the camera may utilize one or more sleep modes to help conserve battery life for the wireless camera. For example, the first control architecture may have a longer sleep mode and can be woken by the second control architecture upon receiving certain communications, and the second control architecture can be woken periodically for maintenance communication.

The wireless camera can be connected to a Wi-Fi™ enable base station (BS). The camera and the base station should be in a "synced" state under normal situations. A synced state refers to both the camera and the base station knowing that the camera is associated with the base station. Some abnormal conditions (e.g., network interference) can cause the camera and the base station to become "out-of-sync" or in an "out-of-sync" state. The camera and the base station may not realize they are out-of-sync for a period of time. When this situation occurs, known past systems are only re-associated when the camera performs a new power cycle synchronization. This causes time delays and increased power losses. Accordingly, a need exists to detect and address an out-of-sync state more quickly.

SUMMARY OF THE INVENTION

According to aspects of the invention, an end device or node uses beacon frames from an access point to more quickly identify an out-of-sync error. A beacon frame is a small packet of data transmitted from the access point (such as a base station) to the nodes. The end device (such as a battery-powered wireless camera) can include a first control architecture (e.g., a camera host hardware chip set) and a second control architecture (e.g., a camera Wi-Fi™ system on chip). The second control architecture periodically acquires the beacon frame while the first control architecture is in an idle state. The access point passes end device association information through the beacon frames. The second control architecture decodes the beacon frame, including whether the association is present. If the association is not present, an out-of-sync error condition arises, and the second control architecture wakes the first control architecture. The end device can then proceed to re-sync with the access point. Accordingly, the end device, such as a Wi-Fi™ enabled camera, can identify and correct an out-of-sync state more quickly than past cameras, thereby improving system performance.

In one aspect, a method of conserving a battery-powered electronic device is disclosed. The electronic device is wirelessly communicable with an access point over a wireless local area network. The method includes causing a first control architecture to be in an idle state; while the first control architecture is in an idle state and with a second control architecture, receiving a beacon frame from the access point, the beacon frame including electronic device association information, checking the beacon frame if the electronic device is associated with the access point, and providing a wakeup signal to the first control architecture when the electronic device is dissociated. The method further includes communicating from the second control architecture to the first control architecture that the electronic device is dissociated from the access point.

In a further aspect, the method can include, with the first control architecture and in response to being dissociated from the access point, initiating a connection session to the access point and syncing the electronic device with the access point. The method can also include causing the first control architecture to reenter the idle state; and while the first control architecture has reentered the idle state and with the second control architecture, receiving a second beacon frame from the access point, the second beacon frame including the electronic device association information, checking the beacon frame if the electronic device is associated with the access point.

Another aspect of the present invention provides a digital video camera in wireless communication with an access point via a wireless network. The camera includes a lens, an image capture element, an antenna, and a first control architecture. The first control architecture includes a first processor, and a first memory communicably coupled to the first processor. The first memory stores a sleep module including instructions that, when executed by the processor, cause the processor to cause the first control architecture to be in an idle state. The camera further includes a second control architecture. The second control architecture includes a second processor and a second memory communicably coupled to the second processor. The memory stores a communication module including instructions that, when executed by the second processor, cause the second processor to, while the first control architecture is in the idle state, receive a beacon frame from the access point, the beacon frame including electronic device association information, check the beacon frame if the camera is associated with the access point. The second memory further stores an interrupt module including instruction that, when executed by the processor, cause the second processor to initiate a wakeup signal to the first control architecture when the electronic camera is dissociated from the access point.

In a further aspect, the present invention provides a system including a base station coupled to the camera.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which:

FIG. 6 is an example beacon frame transmitted from the base station to the camera in the system of FIG. 1.

DETAILED DESCRIPTION OF THE PREFERRED EMBODIMENTS

Figure 1:
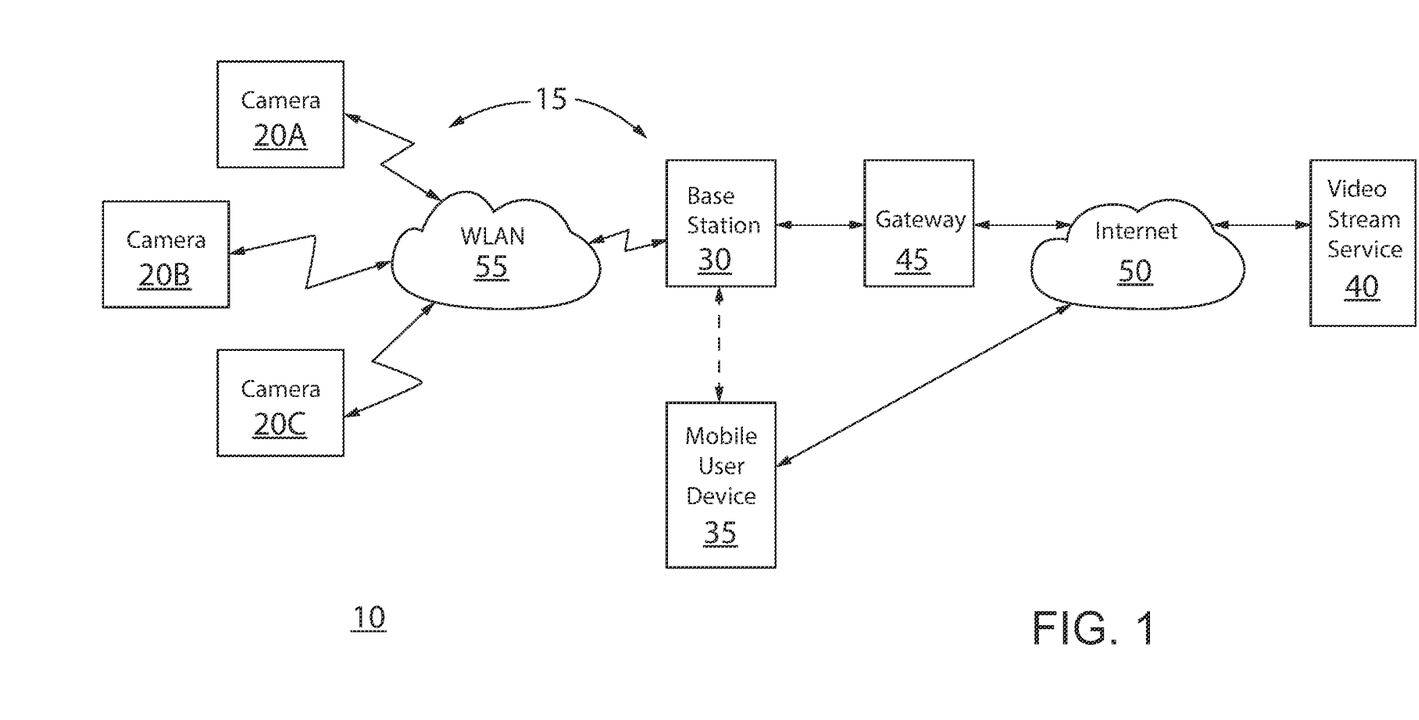
FIG. 1 is block diagram representing a system for capturing, transmitting, and displaying images according to aspects of the invention.

FIG. 1 represents a system 10 for capturing, transmitting, and displaying images, such as images of a video. The video is acquired at a first location and displayed at a second location. The shown system 10 includes a wireless camera network 15 having a plurality of wireless node cameras 20A-C transmitting and receiving wireless signals to and from an access point (AP) via the wireless network 25. The access point is shown as a base station 30. Although three cameras 20A-C are shown in FIG. 1, a system can have more or fewer cameras. The system 10 also includes a remote electronic device, which is shown as a mobile user device 35, and a video stream service 40. The user device 35 and the video stream service 40 are in communication with the base station 30 via a gateway 45 and the Internet 30. It is contemplated that many different arrangements are possible for the system 10, and the shown system 10 is provided for ease of explanation. For example, the base station 30 may be one component of a larger wired and/or wireless local area network (LAN) having many access points communicating with the cameras 20A-C.

The cameras 20A-C are in communication with the base station 30. The base station 30 can host a private local area network, which is shown as the wireless local area network (WLAN) 55. The WLAN 55 of one implementation is an IEEE 802.11 local area network (LAN) that follows the network protocols of the Wi-Fi™ Alliance. Such a network is typically referred to as a Wi-Fi™ network. However, the WLAN 55 can be or include other wireless local area networks.

Electronic devices communicate data to and from the cameras 20A-C. One example electronic device is the mobile user device 35. Exemplary mobile user devices can be a smart phone, tablet computer, or a laptop computer, etc. The electronic device can alternatively be a stationary user device. A stationary user device, such as a desktop computer, is an electronic device that is generally considered by one skilled in the art as stationary even though the device can move.

Another electronic device that communicates data to and from the camera is the video stream service 40. The video stream service 40 can be a commercially available service for storing and/or analyzing the images and/or video. Exemplary analyzing services include enabling the camera to differentiate between humans and animals, reducing false motion notifications, sending alerts and screenshots to the user device 35, etc. The video stream service 40 can also provide a secure gateway for video to be communicated from the cameras 20A-C to the user device 35. An exemplary video stream service 40 is Arlo's Smart™ video stream service available from Arlo Technologies, Inc. in San Jose, California, U.S.

Figure 2:
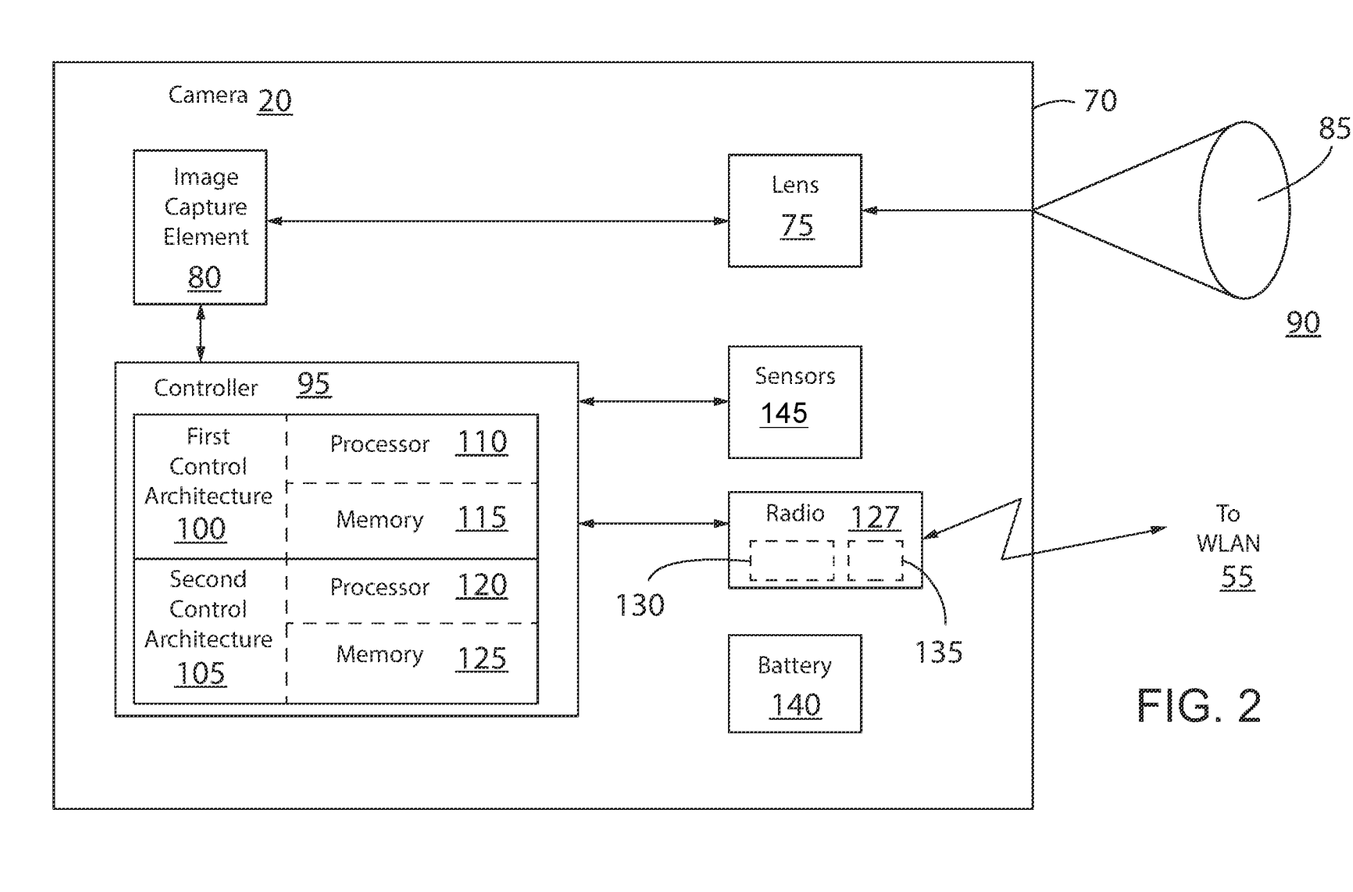
FIG. 2 is a block diagram representing a camera shown in FIG. 1.

FIG. 2 represents an example camera 20 shown in FIG. 1. In the illustration, the camera 20 has a small and compact housing 70 for enclosing and protecting the various camera components illustrated as blocks in FIG. 2. The camera 20 includes a lens 75 and an image capture element (or primary sensor) 80. The image capture element 80 can be any suitable type of image capturing device or sensor, including, for example, an area array sensor, a Charge Coupled Device (CCD) sensor, a Complementary Metal Oxide Semiconductor (CMOS) sensor, or a linear array sensor, just to name a few possibilities. The image capture element 80 may capture images in suitable wavelengths on the electromagnetic spectrum. The image capture element 80 may capture color images and/or grayscale images.

The camera 20 has a field of view 85 extending radially from the outwardly facing lens 75. The field of view 80 is a portion of the environment 90 within which the camera 20 can detect electromagnetic radiation via the lens 75 and image capture element 80. The camera 20 is configured to capture images. An image is a digital representation of a scene from the environment 90 as captured by the camera 20. Capturing an image refers to the act of obtaining and recording an image data file or stream of the digital representation. The scene is the portion of the environment 90 observed through the field of view 85. Capturing a plurality of images in a timed sequence can result in a video. Capturing a video refers to the act of obtaining and recording a video data file or stream of the digital representation.

Referring back to FIG. 2, the camera 20 has a controller 95 including a first control architecture 100 and a second control architecture 105. The first control architecture 100 includes a first processor 110 and a first memory 115, and the second control architecture 105 includes a second processor 120 and a second memory 125. While the arrangement of FIG. 2 shows the controller having dual processors and memories, it is envisioned that many other arrangements are possible.

The processors 110 and 120 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 110 and/or 120 can include a hardware circuit (e.g., an integrated circuit) configured to carry out instructions contained in program code.

The memories 115 and 120 store one or more types of instructions and/or data. The memories 115 and 120 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memories 115 and/or 120 can be a component of a processor, can be operatively connected to a processor for use thereby, or a combination of both.

The memories 115 and 125 can include various instructions stored thereon. For example, the memories 115 and 125 can store one or more modules. Modules can be or include computer-readable instructions that, when executed by a processor, cause a processor to perform the various functions disclosed herein. Example modules in memory 115 include a sleep module for causing the first control architecture to enter and exit an idle state. Example modules in memory 125 include a communication module for communicating with the base station 30, and an interrupt module for initiating a wakeup signal to the first control architecture. While functions may be described herein for purposes of brevity, it is noted that the functions are performed by the first processor 110 or the second processor 120 using the instructions stored on or included in the various modules described herein. Some modules may be stored remotely and accessible by a processor using, for instance, various communication devices and protocols.

In accordance with one construction, the first control architecture 100 includes a separate device from the second control architecture 105 such that the first and second control architectures can enter and exit idle states independently of one another. As used herein, an idle state is broadly defined as stand by, suspend, power off, hibernation, hybrid sleep, sleep, and related modes. In one construction, the first control architecture 100 includes camera host hardware and the second control architecture 105 includes communication system-on-chip (SoC) hardware. The first control architecture 100 (e.g., the camera host hardware) performs image processing functions on image data received from the image capture element 80, and controls handling of messages received from and transmitted to the base station 30. When there are no messages to be received or transmitted, and no image processing functions to be performed, the first control architecture 100 can be powered down or placed in a low-power sleep mode. The second control architecture 105 (e.g., the communication system-on-chip hardware) controls operation of the camera 20 when the first control architecture 100 is powered down and powers up the first control architecture 100 upon the occurrence of one or more predetermined triggering events. The first control architecture 100, when awake, is the master controller of the camera 20 and functions as the host processor to the radio (discussed below) and the image capture element 80. Further discussion regarding the relationship between the first control architecture and the second control architecture will be provided below.

Before moving to other components of the camera 20, it should be understood by somebody skilled in the art that the controller 95 includes many additional conventional elements typically found in a wireless camera controller. Example elements include, but are not limited to, one or more floodlights or any of various sensors and detectors employed by surveillance cameras. Further discussion regarding these components is not provided herein since the components are conventional.

The camera 20 communicates wirelessly (e.g., with the base station 30) via a radio 127. An example of a radio includes a wireless local area network (WLAN) radio. With the WLAN radio 127, the camera 20 generally communicates over a short-range wireless communication network, such as the WLAN 55. In one implementation, the radio 127 includes a transceiver 130 for transmitting and receiving signals to and from the base station 30, via an antenna 135. The transceiver 130 can be separate to or part of the second control architecture 130. The wireless communication can be as prescribed by the IEEE 802.11 standards in accordance with the Wi-Fi™ communication protocol. It is appreciated, however, that the camera 20 can be adapted to perform communications in accordance with any known or to be developed communication protocol, or even a proprietary communication protocol developed for a particular application.

The camera 20 is battery-powered by a battery (or battery pack) 140. In one implementation, the life of the battery 140 is extended by having the camera 20 normally operate in an idle state, and only activating the camera, or portions of the camera, for necessary periods of time to perform one or more desired functions. For example, the default mode of operation of the camera 20 is a sleep mode wherein the controller 95 is substantially deactivated. In this mode, the controller 95, or any deactivated portion thereof, are only activated on an "as needed" basis. Further examples of this operation will be described below.

The camera 20 can further include secondary sensors 145, which may also be used to generate an interrupt signal. For example, a secondary sensor 145 may be a microphone which generates an interrupt signal upon receiving an audio signal above a defined threshold. Alternatively, the secondary sensor 145 may be a motion sensor for sensing motion in a room, for example. Such secondary sensors 145 are useful, for example, in security situations to detect if an unauthorized entry into a particular area has occurred. Upon detecting a substantial noise and/or motion, an interrupt signal is generated, which can then activate a portion of the controller 95. Other example secondary sensors 145 include a temperature sensor, an image sensor, and a vibration sensor.

An exemplary camera capable of incorporating aspects of the invention is an Arlo Ultra brand camera available from Arlo Technologies in San Jose, California, US. Before moving to other components of the system 10, it should be understood by somebody skilled in the art that the camera 20 includes many additional conventional components typically found in a wireless camera. Example components include, but are not limited to, floodlights, doorbells, and any of various sensors. Further discussion regarding these components is not provided herein since the components are conventional.

Figure 3:
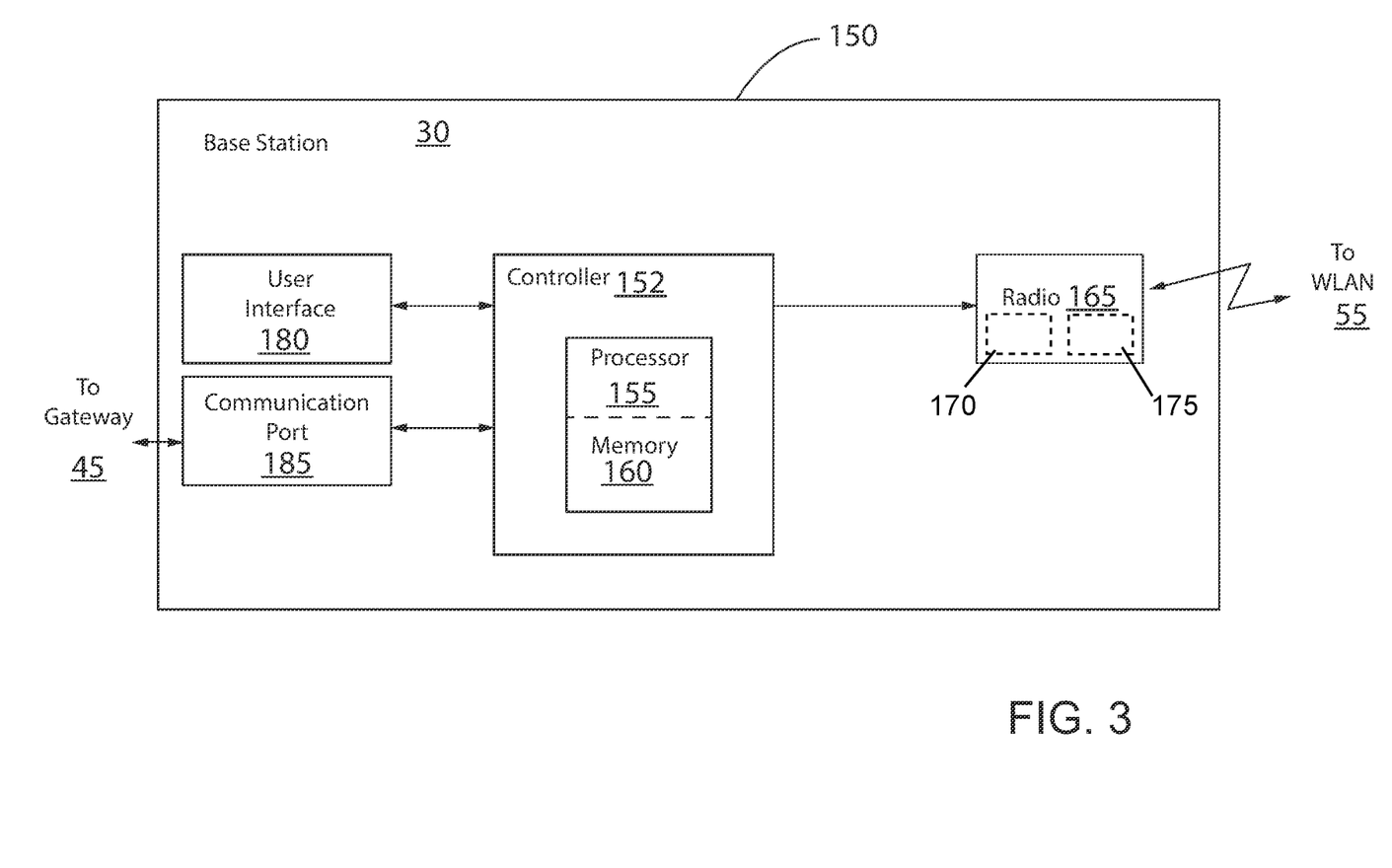
FIG. 3 is a block diagram representing a base station shown in FIG. 1.

Turning now to FIG. 3, the figure represents an example of the base station 30 shown in FIG. 1. In the illustration, the base station 30 has a housing 150 for enclosing and protecting the various components illustrated as blocks in FIG. 3. The base station 30 has a controller 152, including a processor 155 and a memory 160. While the arrangement of FIG. 3 shows a single processor 155 and a single memory 160, it is envisioned that many other arrangements are possible. For example, multiple elements of the base station 30 can include a distinct processor and memory.

The processor 155 can include a component or group of components that are configured to execute, implement, and/or perform any of the processes or functions described herein for the base station 30 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 155 can include a hardware circuit (e.g., an integrated circuit) configured to carry out instructions contained in program code. In arrangements in which there are a plurality of processors, such processors can work independently from each other or one or more processors can work in combination with each other.

The base station 30 includes a memory 160 for storing one or more types of instructions and/or data. The memory 160 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 160 can be a component of the processor 155, can be operatively connected to the processor 155 for use thereby, or a combination of both.

In one or more arrangements, the memory 160 can include various instructions stored thereon. For example, the memory 160 can store one or more modules. Modules can be or include computer-readable instructions that, when executed by the processor 155, cause the processor 155 to perform the various functions disclosed for the module. While functions may be described herein for purposes of brevity, it is noted that the functions are performed by the processor 155 using the instructions stored on or included in the various modules. Some modules may be stored remotely and accessible by the processor 155 using, for instance, various communication devices and protocols.

The base station 30 also could be combined with a gateway router 45 or another device in a single module, which would still be considered a "base station" within the meaning of the present disclosure. Stated another way, the access point formed by the base station could be contained in the gateway router 45 and/or other system component(s).

The base station 30 communicates wirelessly (e.g., with the cameras 20A-C) via a radio 165. An example of a radio includes a wireless local area network (WLAN) radio. With the WLAN radio, the base station 30 generally communicates over a short-range wireless communication network, such as the WLAN 55. In one implementation, the radio 165 includes a transceiver 170 for transmitting and receiving signals to and from the camera 20, via an antenna 175. The transceiver 170 can be separate to or part of the controller 152. The wireless communication can be as prescribed by the IEEE 802.11 standards in accordance with the Wi-Fi™ communication protocol. It is appreciated, however, that the base station 30 can be adapted to perform communications in accordance with any known or to be developed communication protocol, or even a proprietary communication protocol developed for a particular application.

The base station 30 includes the user interface 180. The user interface 180 can include an input apparatus and an output apparatus. The input apparatus includes a device, component, system, element, or arrangement or groups thereof that enable information/data to be entered into the base station 30 from a user. The output apparatus includes any device, component, or arrangement or groups thereof that enable information/data to be presented to the user. The input apparatus and the output apparatus can be combined as a single apparatus, such as a touch screen commonly used by many electronic devices.

The base station 30 includes a communication port 185, which is configured to provide a communication interface between a larger computer network, such as the Internet 50 via the gateway 45, for example, and the wireless camera network 15.

In one construction, since the base station 30 is powered by an enduring power source (e.g., power outlet), it is not necessary for the base station 30 to be operated in a default sleep mode, although this is not precluded. An exemplary base station capable of incorporating aspects of the invention is an Arlo SmartHub brand base station available from Arlo Technologies in San Jose, California, US. Before moving to the operation of the system 10, it should be well understood by somebody skilled in the art that the base station 30 includes many additional conventional components typically found in a base station or access point.

For the camera 20 described above, it should be appreciated that conserving the power of the battery 140 and avoiding undue power drainage of the battery 140 is highly desirable. By conserving power and avoiding undue power drainage, the battery 140 requires less frequent recharging and/or replacement, which is not only more convenient but also less expensive for the user.

During operation of the system 10, the base station 30 broadcasts a beacon frame, among other communication. A beacon frame is one of the management frames in IEEE 802.11 based WLANs. A beacon frame contains information about the network and is transmitted periodically. The beacon frame serves to announce the presence of a wireless LAN and to synchronize the members of the service set. Beacon frames are transmitted by the base station 30 in an infrastructure basic service set (BSS).

While beacons do cause some non-trivial overhead for a network, they are necessary for the proper operation of a network. When a wireless node (e.g., camera 20) receives a beacon frame, it receives information about the capabilities and configuration of that network. The wireless node may also be able to generate a list of available eligible networks, sorted by signal strength.

After initial power ON, the camera 20 attempts to associate with one or more AP's. For example, the camera 20 can associate with the base station 30. Once associated with the base station 30, the camera 20 may transition to an idle state. In this idle state, the camera 20 is in a low power state where all non-essential components or units are powered down or in sleep mode in order to conserve power. In one embodiment, the first control architecture 100, and more specifically the first processor 110, are placed in an idle state, to be awakened by the second control architecture, and more specifically the second processor 120, upon the occurrence of a predetermined triggering event. In the idle state, information pertaining to the last state of the controller 95 is maintained in the first memory 115, as necessary, so that when the first control architecture is awakened, it may resume operations from its last state before it entered the idle state.

After associating with a network, such as network 55, the second control architecture 105 of the camera 20 continues to scan for beacons. This has several benefits. For example, as the camera 20 still receives beacon frames from the currently associated base station 30, the camera 20 is able to use the timestamps in those beacon frames to update its internal clock. Beacon frames from the currently associated base station 30 also inform the camera 20 of imminent configuration changes.

Another benefit of beacons is to enable the camera 20 to have power saving modes. For example, the base station 30 holds on to packets destined for the nodes that are currently idled. In a traffic indication map of a beacon frame, the base station 30 is able to inform nodes, such as camera 20, that they have frames waiting for delivery.

In one operation, the camera 20, when in the idle state, periodically listens for beacons from the base station. The camera 20 may skip a predetermined number of beacons then attempt to capture the next beacon. Contained in the beacon is a Traffic Indication Map (TIM) or a Delivery Traffic Indication Map (DTIM), which contains information indicating whether information or a message is waiting to be sent to the camera 20. If the TIM or DTIM indicates that the camera 20 has a message waiting to be sent to the camera 20, this will trigger the second processor 120 to wake the first processor 110, which will then request the message or data from the base station 30. Upon receiving the message, the first processor 110 will process any instructions or data contained in the message and, thereafter, the camera 20 returns to the idle state with the first control architecture 100 and other non-essential units powered down or in a sleep mode. In one construction, the first processor 110, the first memory 115, and image capture element 80 are devices that are powered down when the camera 20 is associated with the base station 30 but in an idle state. In this state, the second processor 120, the second memory 125, and the radio 127 are placed in low-power modes.

If an event occurs that requires the attention of the first processor 110 and the first processor 110 is already powered up, then the second processor 115 will simply inform the first processor of an interrupt. If the first processor 110 is in an idle state when the event occurs, the second processor 120 first awakes the first processor and then informs it of the interrupt. When the first processor 110 has completed all of its operations it will again power down and enter an idle state. Before powering down, the first processor 110 saves its current state information, and any other desired information, in the first memory 115.

Accordingly in some operations, the second processor 120 only wakes the first processor 110 when the camera needs to transmit traffic (e.g., images) to the base station 30, or when the second processor 120 receives layer three traffic packets (such as an IP packet) from the base station 30. When the camera 20 is connected to the base station 30, the camera 20 and the base station 30 should be in the synced state in a normal situation (meaning both sides know that the camera is connected). Some abnormal conditions can cause the camera 20 and the base station 30 to go out of sync and not realize the components are out of sync for a very long time. For example, the camera 20 may believe it is in a connected state but the base station 30 may believe the camera 20 is not associated anymore.

Figure 4:
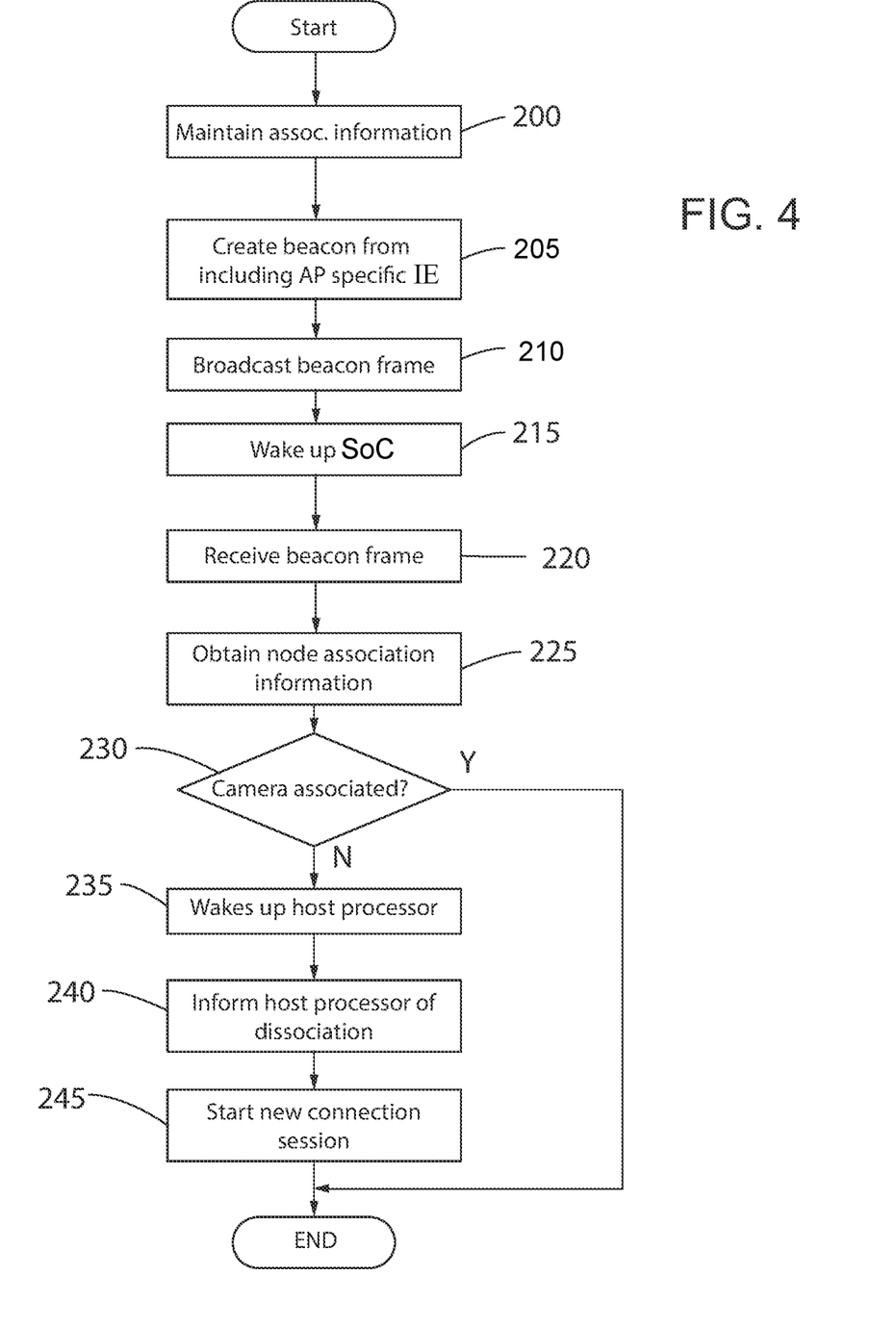
FIG. 4 is an example flow chart of a method of operating the system of FIG. 1.

One implementation for detecting and addressing an out-of-sync situation is shown in FIG. 4. At the base station 30 side, the processor 155 maintains an association list in the memory 160 (block 200). The association list refers to nodes that are associated or connected to the base station. The base station 30 periodically communicates the current association list in the form of association information. For example, the base station 30 can periodically broadcast the camera MAC address list associated with the base station 30 (block 210). As another example, the base station 30 and cameras 20A-C can be from the same manufacture/vendor. Under this scenario, the base station 30 can use shorthand proprietary lists, or even bits, to communicate association information. The base station 30 creates, defines, and encodes a specific information element (IE) to include the camera association information (block 205). The base station 30 will include this AP specific IE into the beacon frame.

At the camera 20, the second control architecture 105 will wake up from its idle state (block 215), receive the beacon frame (block 220) decode the AP specific IE, and retrieve the node association information (block 225). The processor 120 determines whether the camera 20 is identified in the association information (block 230). If the processor 120 determines that the camera 20 is dissociated from the base station 30, the processor 120 clears its state machine locally, and wakes the first control architecture 100 (block 235) to inform it of the camera dissociation condition (block 240).

The first control architecture 100 upon receiving the disassociation condition cleans its state machine. The processor 110 will then start a new connection session (block 245) to associate the camera 20 to the base station 30 and re-sync with the base station 30 again.

Figure 5:
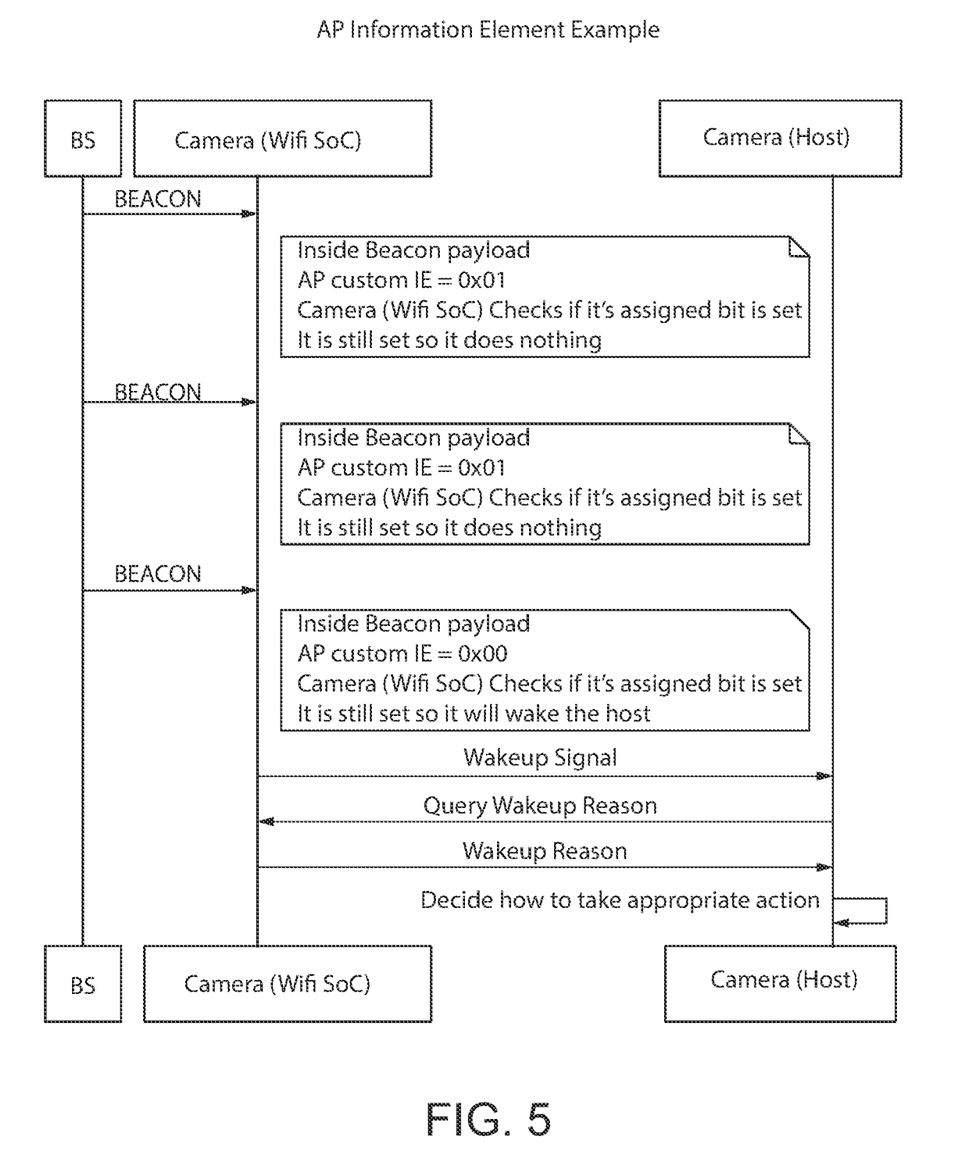
FIG. 5 is an example timing diagram for communication among the base station and camera of FIG. 1.

FIG. 5 provides a diagram showing the flow of packets and actions between the base station 30 and the camera 20. In this example, the camera 20 has been associated to the base station 30 for a time and the first control architecture 100 is asleep. The camera 20 has been assigned a bit (e.g., the first bit) inside the AP specific Information Element (IE). The IE is embedded in the payload of the beacon frame that the base station 30 broadcasts. As illustrated, the camera 20 receives a continuous stream of beacon messages from the base station 30. In the first two illustrated beacon messages, the first bit inside the AP specific IE is on. This is indicated by the hexadecimal value 0x01. If the bit assigned for a particular camera is true, then the corresponding camera 20 receiving the beacon message knows that the base station 30 has marked it as associated. When the camera 20 detects that it is identified as associated by the base station 30, nor further action is required by the camera. In the third illustrated beacon message, the first bit inside the AP specific IE is off. This is indicated by the hexadecimal value 0x00. If the bit assigned for a particular camera is false, then the corresponding camera 20 receiving the beacon message knows that the base station 30 has marked it as disassociated. As further illustrated in FIG. 5, when the camera 20 detects that it is identified as disassociated by the base station 30, the camera 20 takes additional action to rectify this situation. The second control architecture 105 will execute steps 235-245, as previously discussed, to wakeup up the first control architecture 100 and have the camera 20 establish a new connection session with the base station 30.

FIG. 6 provides a snap shot of a decoded beacon frame that displays the association IE of the beacon payload. The AP specific IE can be placed anywhere in the AP specific IE list (order does not matter, it could be the first IE or last IE, as long as the base station 30 and the camera 20 know the arrangement). In one embodiment, the IE's contents would be a simple bit mask where each bit in the bit mask is assigned to a specific camera 20A-C when they first associate.

Accordingly, the invention provides a new and useful method for associating a battery-powered node wirelessly communicable with an access point, detecting a loss of association between the node and the access point, and re-associating the node and the access point. Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

A particular software module may comprise a single instruction or many instructions, and may be distributed over several different code segments, among different programs, and across several computer-readable storage media. In addition, data being tied or rendered together in a database record may be resident in the same computer-readable storage medium, or across several computer-readable storage media, and may be linked together in fields of a record in a database across a network.

The block diagrams and flowcharts in the figures illustrate the architecture, functionality, and operation of possible implementations of systems, methods, and computer program products according to various embodiments. In some embodiments, one element may be designed as multiple elements or multiple elements may be designed as one element. In some embodiments, an element shown as an internal component of another element may be implemented as an external component and vice versa. Furthermore, elements may not be drawn to scale. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. A typical combination of hardware and software can be a processing system with computer-usable program code that, when being loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the maintenance conditions enabling the implementation of the methods described herein and which, when loaded in a processing system, is able to carry out these methods.

Nothing in this application is considered critical or essential to the present invention unless explicitly indicated as being "critical" or "essential." In addition, the individual components need not be assembled in the disclosed configuration but could be assembled in virtually any configuration. Furthermore, all the disclosed features of each disclosed embodiment can be combined with, or substituted for, the disclosed features of every other disclosed embodiment except where such features are mutually exclusive.

What is claimed is:

1. A method of operating an electronic device, the electronic device wirelessly communicable with an access point over a wireless local area network, the method comprising:
    causing a first control architecture to be in an idle state;
    while the first control architecture is in an idle state and with a second control architecture:
        receiving a beacon frame from the access point, the beacon frame including electronic device association information,
        checking the beacon frame if the electronic device is associated with the access point, and
        providing a wakeup signal to the first control architecture when the electronic device is dissociated; and
    communicating from the second control architecture to the first control architecture that the electronic device is dissociated from the access point.

2. The method of claim 1, the method further comprising, with the first control architecture and in response to being dissociated from the access point:
    initiating a connection session to the access point; and
    syncing the electronic device with the access point.

3. The method of claim 2, the method further comprising:
    causing the first control architecture to reenter the idle state;
    while the first control architecture has reentered the idle state and with the second control architecture,
        receiving a second beacon frame from the access point, the second beacon frame including second electronic device association information;
        checking the beacon frame if the electronic device is associated with the access point.

4. The method of claim 3, the method further comprising not providing the wakeup signal to the first control architecture when the electronic device is identified in the beacon frame.

5. The method of claim 1, wherein the electronic device includes a camera, and the access point includes a base station in wireless communication with the camera.

6. The method of claim 1, wherein the beacon frame follows the IEEE 802.11 standard.

7. The method of claim 1, wherein checking the beacon frame includes scanning the electronic device association information for an identifier related to the electronic device.

8. A digital video camera in wireless communication with an access point via a wireless network, the camera comprising:
    a lens;
    an image capture element;
    an antenna;
    a first control architecture including a first processor, a first memory communicably coupled to the first processor and storing a sleep module including instructions that, when executed by the first processor, cause the first control architecture to be in an idle state;
    a second control architecture, the second control architecture including a second processor and a second memory communicably coupled to the second processor and storing:

a communication module including instructions that, when executed by the second processor, cause the second processor to:
while the first control architecture is in the idle state, receive a beacon frame from the access point, the beacon frame including electronic device association information, and
check the beacon frame if the camera is associated with the access point,
an interrupt module including instructions that are executed by the second processor when the electronic camera is dissociated from the access point, wherein the interrupt module causes the second processor to initiate a wakeup signal to the first control architecture.

9. The digital video camera of claim 8, wherein the first control architecture includes a camera host hardware, and wherein the second control architecture includes communication system-on-chip (SoC) hardware.

10. The digital video camera of claim 9, wherein the memory of the camera host hardware includes instructions for camera related applications and instructions for a host communication driver, and wherein the SoC hardware includes instructions for wireless communication.

11. The digital video camera of claim 9, wherein the SoC hardware includes instructions for communicating following the IEEE 802.11 standard.

12. The digital video camera of claim 8, wherein the first memory further stores a second communication module having instructions that, when executed by the first processor, cause the first processor to
initiate a connection session with the access point in response to being dissociated from the access point, and
sync the camera with the access point.

13. The digital video camera of claim 8, wherein the beacon frame follows the IEEE 802.11 standard.

14. A system comprising:
a base station comprising:
a first antenna,
a first processor, and
a first memory communicably coupled to the first processor and storing a communication module including instructions that, when executed by the processor, cause the processor to periodically communicate beacon frames, each beacon frame including an information element identifying associated nodes; and
a camera comprising:
a lens,
an image capture element,
a second antenna,
a first control architecture including a second processor, a second memory communicably coupled to the second processor and storing a sleep module including instructions that, when executed by the second processor, cause the second processor to cause the first control architecture to be in a sleep mode; and
a second control architecture, the second control architecture including a third processor and a third memory communicably coupled to the third processor and storing:
a communication module including instructions that, when executed by the third processor, cause the third processor to, while the first control architecture is in a sleep mode:
receive each beacon frame from the base station, the beacon frame including the information element, and
check the information element of the beacon frame to determine if the camera is associated with the access point, and
an interrupt module including instruction that, when executed by the third processor, cause the third processor to initiate a wakeup signal to the first control architecture when the electronic camera is dissociated from the access point.

15. The system of claim 14, wherein the beacon frame follows the IEEE 802.11 standard.

\* \* \* \* \*